United States Patent
Shimizu

(10) Patent No.: US 7,224,486 B2
(45) Date of Patent: May 29, 2007

(54) IMAGE CONVERSION METHOD, IMAGE CONVERSION APPARATUS, AND IMAGE CONVERSION PROGRAM STORAGE MEDIUM

(75) Inventor: Osamu Shimizu, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 884 days.

(21) Appl. No.: 10/103,849

(22) Filed: Mar. 25, 2002

(65) Prior Publication Data

US 2002/0140983 A1    Oct. 3, 2002

(30) Foreign Application Priority Data

Mar. 27, 2001   (JP) .............................. 2001-090523

(51) Int. Cl.
*G06K 15/00*   (2006.01)
(52) U.S. Cl. ..................................... 358/2.99; 358/3.01
(58) Field of Classification Search .............. 358/2.99, 358/3.01, 3.13, 3.1, 3.21, 2.1; 382/237
See application file for complete search history.

(56) References Cited

U.S. PATENT DOCUMENTS 5,506,699 A * 4/1996 Wong ......................... 358/3.08
5,586,058 A * 12/1996 Aloni et al. ................... 702/35
6,360,005 B1 * 3/2002 Aloni et al. ................. 382/148

FOREIGN PATENT DOCUMENTS

JP    2002109533    *   4/2002

* cited by examiner

*Primary Examiner*—Jerome Grant, II
(74) *Attorney, Agent, or Firm*—Sughrue Mion, PLLC

(57) ABSTRACT

In an image conversion method of performing an image conversion between binary area tonal image-to-binary area tonal image, an image conversion apparatus, and an image conversion program storage medium storing an image conversion program which causes a computer to operate as such an image conversion apparatus, a binary area tonal image is once converted into a multi-level image, and pixel values of the multi-level image are converted. An areal ration of each divided area corresponding to the associated pixel of the multi-value image, of the original binary area tonal image is increased or decreased in accordance with the difference value between the pixel values of the associated pixels between the multi-value image after conversion of the pixel value and the multi-value image before conversion of the pixel value.

10 Claims, 14 Drawing Sheets

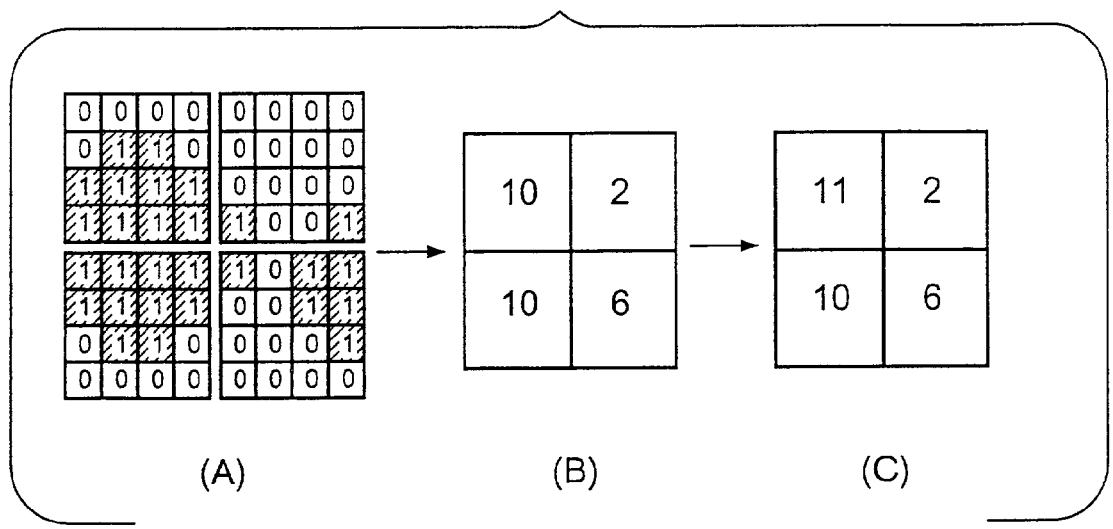

| 9 | 3 | 6 | 0 |
|---|---|---|---|
| 9 | 5 | 14 | 8 |
| 10 | 2 | 5 | 1 |
| 10 | 6 | 13 | 10 |

(B)

| 17 | 43 | 30 | 28 |
|---|---|---|---|
| 29 | 58 | 30 | 26 |
| 32 | 72 | 59 | 50 |
| 18 | 40 | 24 | 19 |

(C)

| 130 | 164 | 185 | 86 |
|---|---|---|---|
| 222 | 312 | 366 | 197 |
| 217 | 290 | 319 | 158 |
| 144 | 205 | 240 | 133 |

IMAGE CONVERSION METHOD, IMAGE CONVERSION APPARATUS, AND IMAGE CONVERSION PROGRAM STORAGE MEDIUM

BACKGROUND OF THE INVENTION

1. Field of the Invention

The present invention relates to an image conversion method of performing an image conversion between binary area tonal image-to-binary area tonal image, an image conversion apparatus, and an image conversion program storage medium storing an image conversion program which causes a computer to operate as such an image conversion apparatus.

2. Description of the Related Art

Hitherto, to perform an image printing using a printing machine, prior to the printing, a printer or the like is used to create a proof image similar to a printed image obtained through the printing by the printing machine, and there is performed a prediction of the finish of the printed image obtained through the printing by the printing machine, referring to the proof image.

In the image printing using the printing machine, for example, a printing dot data generation apparatus receives multi-level data representative of a multi-level image, and the received multi-level data is subjected to a halftone dot processing so that halftone dot data representative of a binary area tonal image is generated by the printing dot data generation apparatus. The printing machine outputs the binary area tonal image on a sheet in accordance with the halftone dot data representative of the binary area tonal image thus generated.

To output a proof image by a printer, for example, a proofing dot data generation apparatus receives multi-level image that is the same as the multi-image data representative of the multi-level image to be inputted to the printing dot data generation apparatus, and the received multi-level data is subjected to a color conversion processing (which will be described later) and in addition the multi-level image subjected to the color conversion processing is subjected to a halftone dot processing is subjected so that proofing dot data representative of a binary area tonal image is generated by the proofing dot data generation apparatus. The printer outputs the binary area tonal image on a sheet in accordance with the proofing halftone dot data representative of the binary area tonal image thus generated. The binary area tonal image outputted from the printer is referred to a proof image.

To perform the color conversion, identified are color reproduction characteristic (a printing profile) describing a relation between image data and colors of the actual printed matter, which is associated with a printing machine of interest, and color reproduction characteristic (a printer profile) describing a relation between image data and colors of an image to be actually printed, which is associated with a printer, and for example, a LUT (Look Up Table) type of color association definition, which comprises a coupling of the printing profile and the printer profile, is created, so that image data for printing is converted into the proofing halftone dot data in accordance with the LUT. The printer outputs a proof image in accordance with the proofing halftone dot data thus obtained, and as a result, it is possible to obtain a proof image, of which color is extremely similar to the color of the actual printed matter to be printed in the printing machine.

However, generally, according to the proof image printed by such a printer, as compared with the binary area tonal image printed by the printing machine, dot structures each defined by angles and intervals in an arrangement of the individual halftone dots, and geometry and magnitude of the individual halftone dots, are mutually different from one another. Difference in the dot structure causes the Rosette pattern and the moiré pattern and in addition a way of occurrence of dot gain to be varied. Accordingly there is a possibility that a proof image different from the printing image in impression is obtained.

On the other hand, when the printing machine and the printer output binary area tonal images in accordance with halftone dot data representative of the same dot structure of binary area tonal image, respectively, the same dot structure can be obtained. However, with respect to the halftone dot data after conversion into the binary area tonal image once, it is impossible to apply the above-mentioned color conversion processing. Thus, there is a possibility that a proof image, which is expressed by a color different from the printing image, is obtained.

SUMMARY OF THE INVENTION

In view of the foregoing, it is an object of the present invention to provide an image conversion method of converting binary area tonal image to binary area tonal image having the extremely same dot structure and being expressed by the extremely same color, an image conversion apparatus, and an image conversion program storage medium storing an image conversion program which causes a computer to operate as such an image conversion apparatus.

To achieve the above-mentioned object, the present invention provides an image conversion method comprising:

a binary to multi-level conversion step of converting a first binary area tonal image into a first multi-level image consisting of an assembly of pixels each having a pixel value according to an areal ratio of an associated divided area of a plurality of divided areas in said first binary area tonal image;

a multi-level to multi-level difference arithmetic step of determining a value representative of difference between associated pixels between the first multi-level image and a second multi-level image, which consists of an assembly of pixels having pixel values after the first multi-level image is converted in pixel values of pixels; and a binary to binary conversion step of converting the first binary area tonal image into the second binary area tonal image in which the areal ratio of a respective area associated with each of pixels of the second multi-level image, of the first binary area tonal image is increased or decreased in accordance with the value representative of the difference between the associated pixels between the first multi-level image and the second multi-level image.

According to the image conversion method of the present invention, a binary area tonal image is once converted into a multi-level image, and pixel values of the multi-level image are converted. Thus, at the stage of the conversion, it is possible to apply the color conversion processing. Further, according to the image conversion method of the present invention, an areal ration of each divided area corresponding to the associated pixel of the multi-value image, of the original binary area tonal image is increased or decreased in accordance with the difference value between the pixel values of the associated pixels between the multi-value image after conversion of the pixel value and the multi-value image before conversion of the pixel value. Thus, as compared with the original binary area tonal image, the halftone dot structure is varied by the corresponding increment or decrement of the areal ratio according to the value representative of the difference. However, as compared with one in which halftone dot data is generated in accordance with the quite different halftone dot structure, according to the present embodiment, it is possible to obtain a new binary area tonal image having the halftone dot structure very close to that of the original binary area tonal image. Therefore, according to the image conversion method of the present invention, it is possible to convert a binary area tonal image into another binary area tonal image having the extremely same dot structure and being expressed by the extremely same color.

In the image conversion method according to the present invention as mentioned above, it is preferable that said multi-level to multi-level difference arithmetic step determines a value representative of difference between associated pixels between a plurality of first multi-level images in which a plurality of first binary area tonal images representative of a plurality of monochromatic images wherein a color image is color-separated are converted, and a plurality of second multi-level images, which are created by multi-dimensional conversion of the plurality of first multi-level images.

To convert a color image consisting of a plurality of binary area tonal images corresponding to a plurality of colors using the above-mentioned image conversion method of the present invention, the color image is formed in accordance with the mutual relationship among the respective colors. Thus, an application of the color conversion processing by the multi-dimensional conversion makes it possible to obtain an image closer in color.

In the image conversion method according to the present invention as mentioned above, it is acceptable that said binary to multi-level conversion step is replaced by a binary to multi-level conversion step comprising a first sub-step in which the first binary area tonal image is converted into a third multi-level image consisting of an assembly of pixels each having a pixel value according to an areal ratio of an associated divided area of a plurality of divided areas in said first binary area tonal image, and a second sub-step of applying an image processing to the third multi-level image obtained through the first sub-step to create the first multi-level image.

Here, it is preferable that said second sub-step is a step of applying a low spatial frequency filtering processing to the third multi-level image.

To convert the binary area tonal image into the multi-level image, there is a possibility of occurrence of moiré which will be caused by interference between a period of division intervals wherein the first binary area tonal image is divided at even intervals in the first sub-process and a period of halftone dots of the first binary area tonal image. Application of the low spatial frequency filtering processing to the multi-level image may reduce moiré, and thus it is possible to obtain the closer image.

In the image conversion method according to the present invention as mentioned above, it is preferable that said binary to binary conversion step inverts a boundary portion of the binary of said first binary area tonal image to increase or decrease the areal ratio.

In the event that the areal ratio is increased or decreased by inverting the boundary portion of the binary of the first binary area tonal image or the binary area tonal image before the conversion, only the halftone dots, wherein the boundary portion is inverted, are simply partially subjected to a change in geometry, and an effect on the halftone dot structure of the binary area tonal image before the conversion may be reduced. Thus, it is possible to obtain the binary area tonal image of the halftone dot structure, which is closer to the halftone dot structure of the binary area tonal image before the conversion.

To achieve the above-mentioned object, the present invention provides an image conversion apparatus comprising:

a binary to multi-level conversion section for converting a first binary area tonal image into a first multi-level image consisting of an assembly of pixels each having a pixel value according to an areal ratio of an associated divided area of a plurality of divided areas in said first binary area tonal image;

a multi-level to multi-level difference arithmetic unit for determining a value representative of difference between associated pixels between the first multi-level image and a second multi-level image, which consists of an assembly of pixels having pixel values after the first multi-level image is converted in pixel values of pixels; and a binary to binary conversion section for converting the first binary area tonal image into the second binary area tonal image in which the areal ratio of a respective area associated with each of pixels of the second multi-level image, of the first binary area tonal image is increased or decreased in accordance with the value representative of the difference between the associated pixels between the first multi-level image and the second multi-level image.

In the image conversion apparatus according to the present invention as mentioned above, it is preferable that said multi-level to multi-level difference arithmetic unit determines a value representative of difference between associated pixels between a plurality of first multi-level images in which a plurality of first binary area tonal images representative of a plurality of monochromatic images wherein a color image is color-separated are converted, and a plurality of second multi-level images, which are created by multi-dimensional conversion of the plurality of first multi-level images.

In the image conversion apparatus according to the present invention as mentioned above, it is acceptable that said binary to multi-level conversion section is replaced by a binary to multi-level conversion section comprising a first conversion section in which the first binary area tonal image is converted into a third multi-level image consisting of an assembly of pixels each having a pixel value according to an areal ratio of an associated divided area of a plurality of divided areas in said first binary area tonal image, and a second conversion section for applying an image processing to the third multi-level image obtained through the first conversion section to create the first multi-level image.

Here, it is preferable that said second conversion section is a section for applying a low spatial frequency filtering processing to the third multi-level image.

In the image conversion apparatus according to the present invention as mentioned above, it is preferable that said binary to binary conversion section inverts a boundary portion of the binary of said first binary area tonal image to increase or decrease the areal ratio.

Further, to achieve the above-mentioned object, the present invention provides an image conversion program storage medium storing an image conversion program which causes a computer to operate as an image conversion apparatus for performing an image conversion between binary area tonal images, said image conversion program comprising:

a binary to multi-level conversion section for converting a first binary area tonal image into a first multi-level image consisting of an assembly of pixels each having a pixel value according to an areal ratio of an associated divided area of a plurality of divided areas in said first binary area tonal image;

a multi-level to multi-level difference arithmetic section for determining a value representative of difference between associated pixels between the first multi-level image and a second multi-level image, which consists of an assembly of pixels having pixel values after the first multi-level image is converted in pixel values of pixels; and a binary to binary conversion section for converting the first binary area tonal image into the second binary area tonal image in which the areal ratio of a respective area associated with each of pixels of the second multi-level image, of the first binary area tonal image is increased or decreased in accordance with the value representative of the difference between the associated pixels between the first multi-level image and the second multi-level image.

In the image conversion program storage medium according to the present invention as mentioned above, it is preferable that said multi-level to multi-level difference arithmetic unit determines a value representative of difference between associated pixels between a plurality of first multi-level images in which a plurality of first binary area tonal images representative of a plurality of monochromatic images wherein a color image is color-separated are converted, and a plurality of second multi-level images, which are created by multi-dimensional conversion of the plurality of first multi-level images.

In the image conversion program storage medium according to the present invention as mentioned above, it is acceptable that said binary to multi-level conversion section is replaced by a binary to multi-level conversion section comprising a first conversion section in which the first binary area tonal image is converted into a third multi-level image consisting of an assembly of pixels each having a pixel value according to an areal ratio of an associated divided area of a plurality of divided areas in said first binary area tonal image, and a second conversion section for applying an image processing to the third multi-level image obtained through the first conversion section to create the first multi-level image.

Here, it is preferable that said second conversion section is a section for applying a low spatial frequency filtering processing to the third multi-level image.

In the image conversion program storage medium according to the present invention as mentioned above, it is preferable that said binary to binary conversion section inverts a boundary portion of the binary of said first binary area tonal image to increase or decrease the areal ratio.

BRIEF DESCRIPTION OF THE DRAWINGS

FIG. 7 is an explanatory view exemplarily showing the first embodiment of an image conversion method of the present invention.

FIG. 8 is an explanatory view exemplarily showing the first embodiment of an image conversion method of the present invention.

FIG. 9 is an explanatory view exemplarily showing the first embodiment of an image conversion method of the present invention.

FIG. 13 is an explanatory view exemplarily showing the second embodiment of an image conversion method of the present invention.

FIG. 16 is an explanatory view exemplarily showing the second embodiment of an image conversion method of the present invention.

DETAILED DESCRIPTION OF PREFERRED EMBODIMENTS

Embodiments of the present invention will be described with reference to the accompanying drawings.

Figure 1:
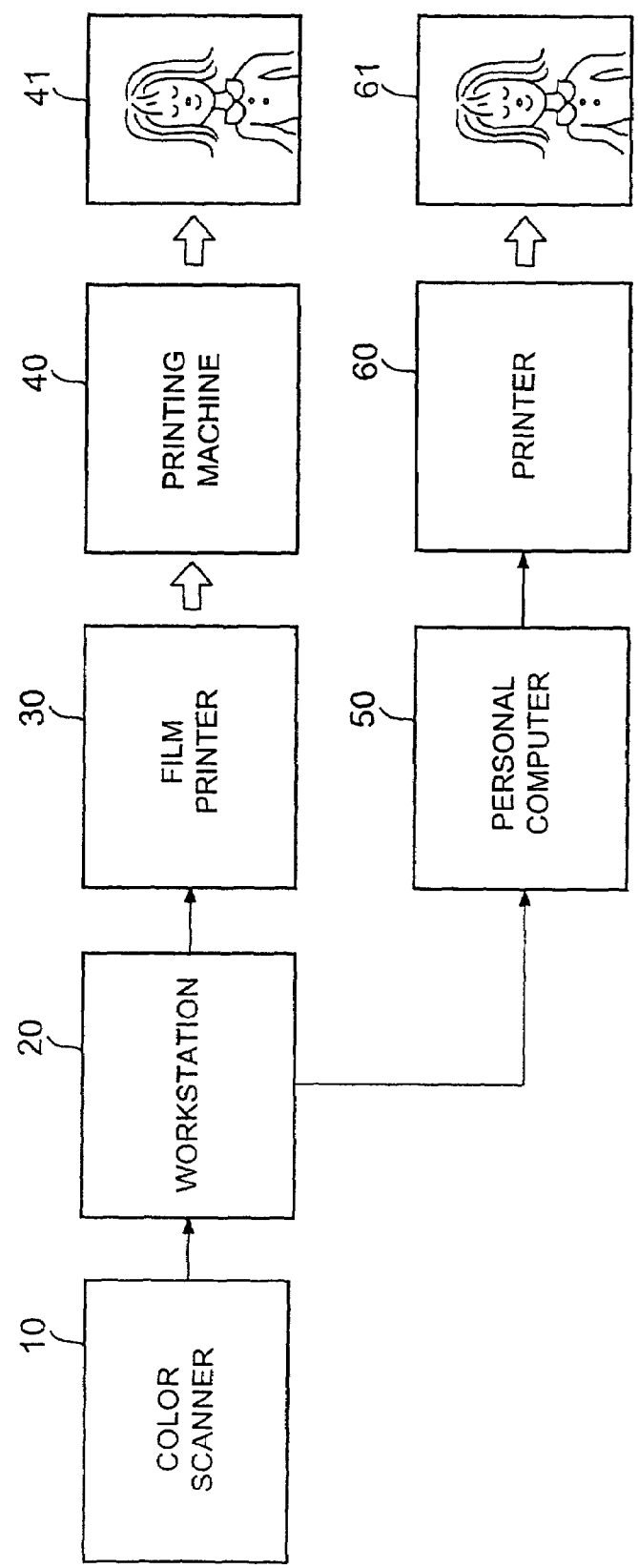
FIG. 1 is a schematic constitution view of a print and proof image creating system to which an embodiment of the present invention is applied.

FIG. 1 is a schematic constitution view of a print and proof image creating system to which an embodiment of the present invention is applied.

A color scanner 10 reads an original image and produces color separation image data of four colors of CMYK representative of the original image. The image data of four colors of CMYK is fed to a workstation 20. The workstation 20 performs an electronic page make-up in accordance with image data entered by an operator to create image data representative of an image for printing. The image data for printing is represented by a multi-level image consisting of pixels having gradation on each of four colors of CMYK. When the printing is performed, the image data for printing is converted into dot data for plate making representative of the binary area tonal image in the workstation 20 and is fed to a film printer 30 so that printing film original plates for CMYK plates are produced in accordance with the dot data for plate making.

A machine plate is produced from the printing film original plate and is mounted on a printing machine 40. Ink is applied to the machine plate mounted on the printing machine 40 and is transferred onto a sheet for print to form a printed image 41 on the sheet.

A series of work, in which the film printer 30 is used to produce the film original plate and further the machine plate, the produced machine plate is mounted on the printing machine 40, and ink is applied to the machine plate to perform a printing on a sheet, is large-scale works and takes a lot of cost. For this reason, before the actual printing works, a personal computer 50 and a printer 60 are used to produce a proof image 61 in accordance with a manner as set forth below, so that a finish of the printed image 41 is confirmed beforehand.

When a proof image 61 is created, plate making dot data representative of a binary area tonal image, which is created on the workstation 20, is fed to a personal computer 50. The personal computer 50 corresponds to an embodiment of the image conversion apparatus referred to in the present invention. The plate making dot data representative of a binary area tonal image, which is transmitted from the workstation 20 to the personal computer 50, is subjected to an image conversion (details will be described later) as an embodiment of the present invention in the personal computer 50, and is converted into halftone dot data so that the proof image 61, which is suitable for the printer 60 and is extremely similar to the printed image 41 in color and in dot structure as well, can be obtained. The printer 60 receives the halftone dot data representative of the binary area tonal image thus subjected to the image conversion, and outputs the proof image 61 on the sheet in accordance with the halftone dot data representative of the binary area tonal image.

To enter the halftone dot data representative of the binary area tonal image, which is created on the workstation 20, to the personal computer 50, this is carried out via the computer network or through storage media such as MO disk (magneto-optical disk).

In this manner, the printer 60 outputs the proof image 61, which is extremely similar to the printed image 41 in color and in dot structure as well.

An aspect as an embodiment of the present invention in the print and proof image creating system shown in FIG. 1 resides in processing contents to be executed inside the personal computer 50. Hereinafter, there will be described the personal computer 50.

Figure 2:
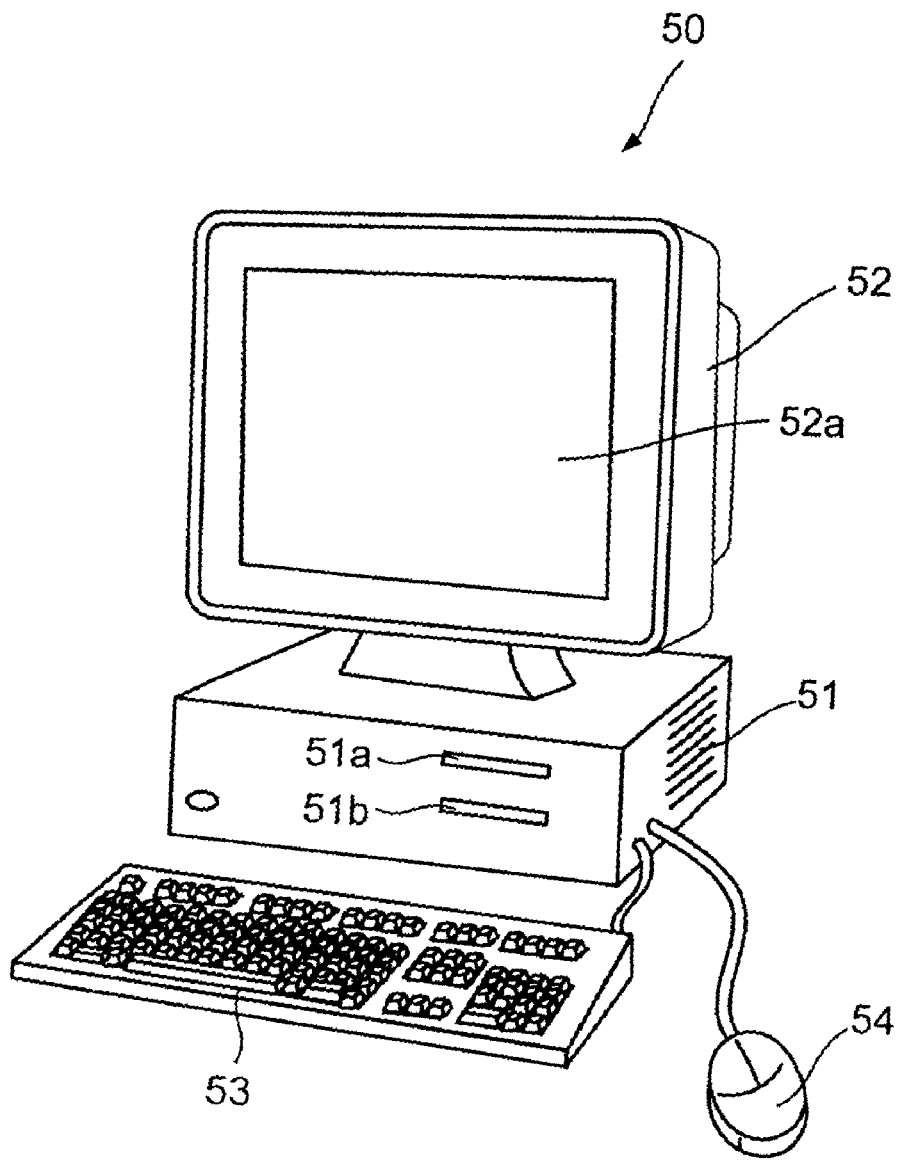
FIG. 2 is a perspective view of a personal computer, which is shown in FIG. 1 with a block.
Figure 3:
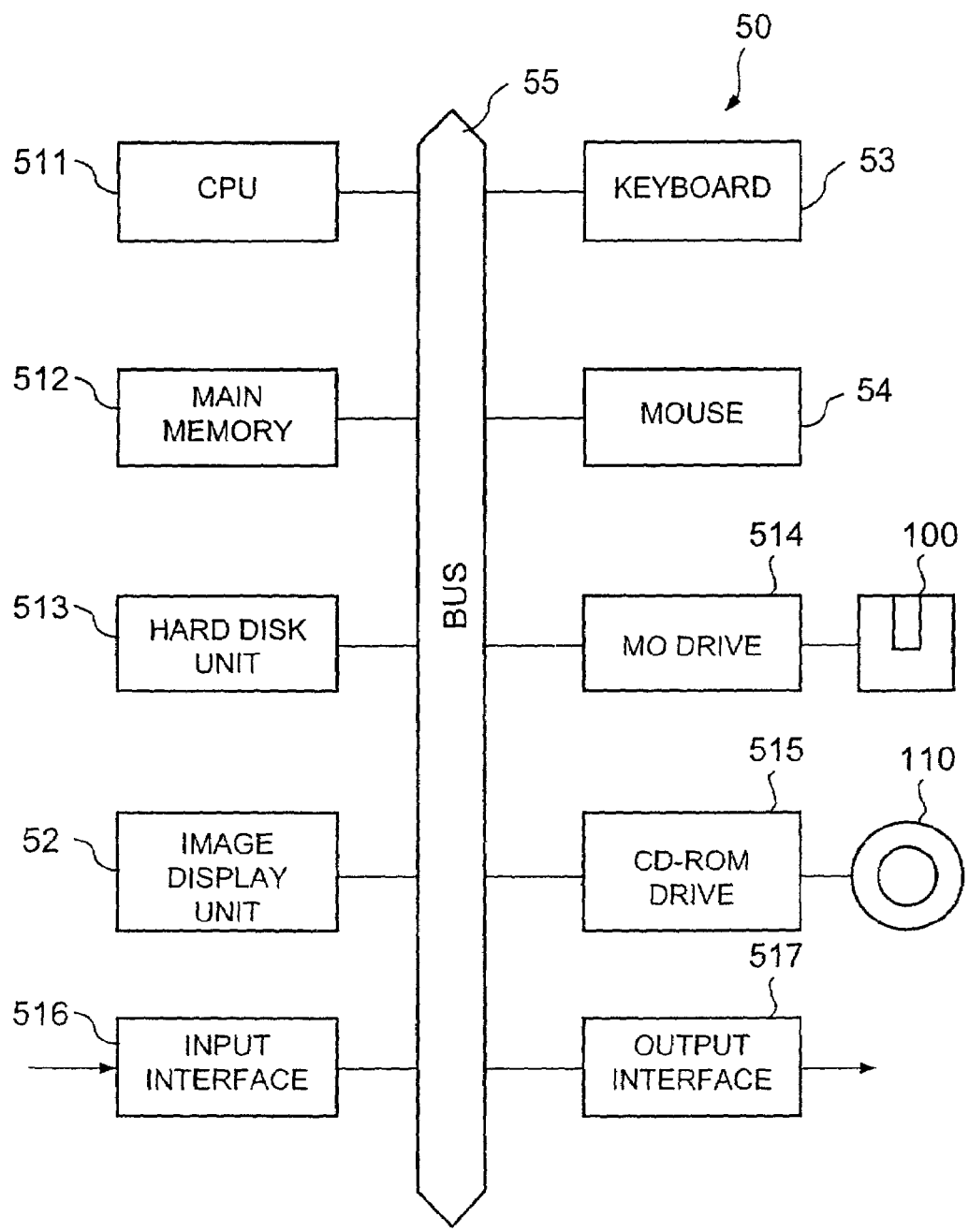
FIG. 3 is a hardware structural view of the personal computer.

FIG. 2 is a perspective view of the personal computer 50 shown in FIG. 1. FIG. 3 is a hardware structural view of the personal computer 50.

The personal computer 50 comprises, on an external appearance, a main frame unit 51, an image display unit 52 for displaying an image on a display screen 52a in accordance with an instruction from the main frame unit 51, a keyboard 53 for inputting various sorts of information to the main frame unit 51 in accordance with a key operation, and a mouse 54 for inputting an instruction according to, for example, an icon and the like, through designation of an optional position on the display screen 52a, the icon and the like being displayed on the position on the display screen 52a. The main frame unit 51 has a floppy disk mounting slot 51a for mounting a floppy disk, and a CD-ROM mounting slot 51b for mounting a CD-ROM.

The main frame unit 51 comprises, as shown in FIG. 3, a CPU 511 for executing a various types of program, a main memory 512 in which a program stored in a hard disk unit 513 is read out and developed for execution by the CPU 511, the hard disk unit 513 for saving various types of programs and image data, an FD drive 514 for accessing a floppy disk 100 mounted thereon, a CD-ROM drive 515 for accessing a CD-ROM 110 mounted thereon, an I/O interface 516 connected to the workstation 20 (cf. FIG. 1), to receive halftone dot data representative of a binary area tonal image from the workstation 20, and an output interface 517 to transmit the halftone dot data representative of a binary area tonal image to the printer 60 (cf. FIG. 1). These various types of elements are connected via a bus 55 to the image display unit 52, the keyboard 53 and the mouse 54.

The CD-ROM 110 stores therein an image data conversion program for causing the personal computer 50 to operate as an image conversion apparatus. The CD-ROM 110 is mounted on the CD-ROM drive 515 so that the image conversion program, which is stored in the CD-ROM 110, is up-loaded on the personal computer 50 and is stored in the hard disk unit 513.

Figure 4:
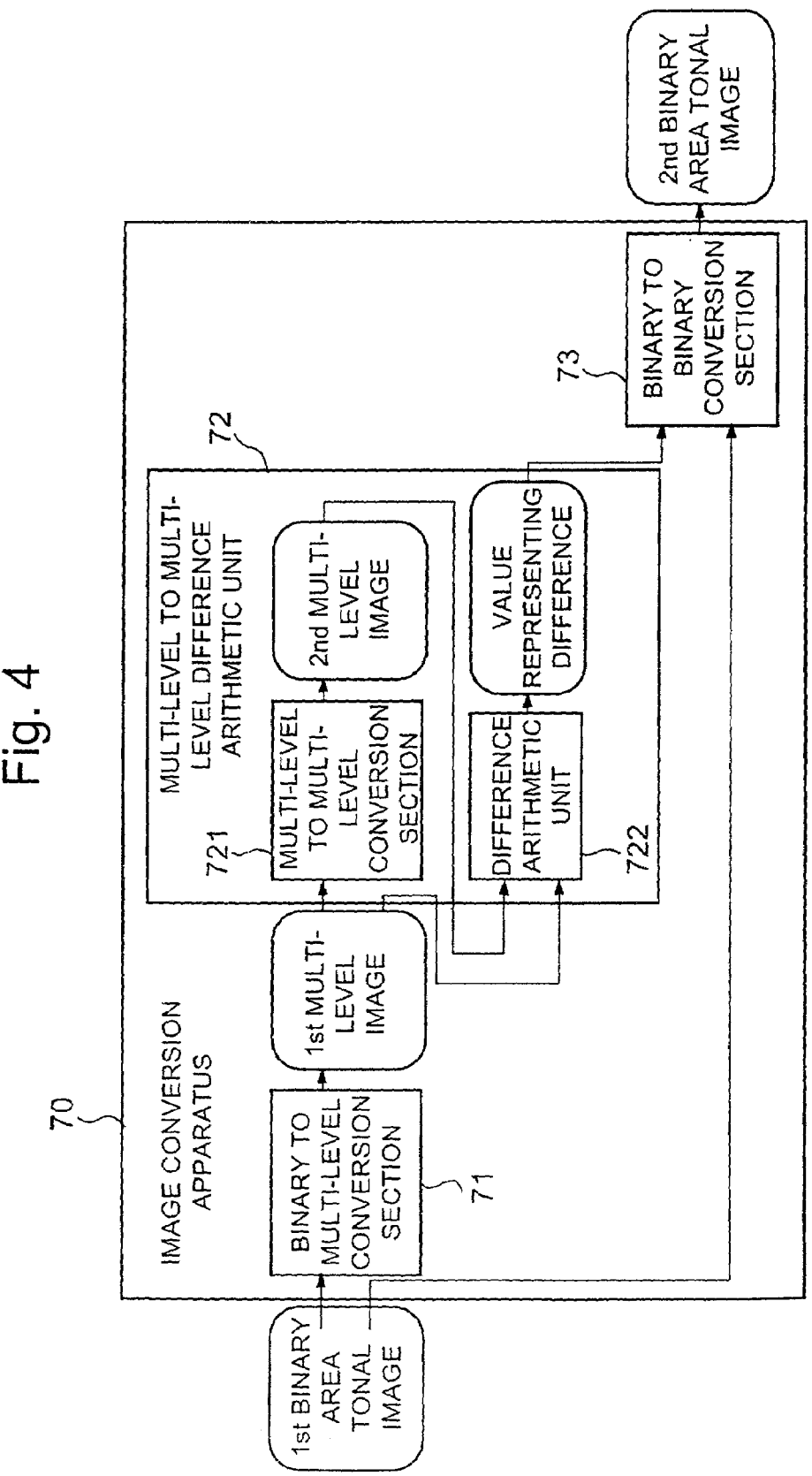
FIG. 4 is a functional block diagram of a first embodiment of an image conversion apparatus of the present invention.

FIG. 4 is a functional block diagram of a first embodiment of an image conversion apparatus of the present invention.

An image conversion apparatus 70 is constituted of the personal computer 50 shown in FIG. 1 to FIG. 3 and an image conversion program to be executed by the personal computer 50. The image conversion apparatus 70 comprises a binary to multi-level conversion section 71, a multi-level to multi-level difference arithmetic unit 72 and a binary to binary conversion section 73. The multi-level to multi-level difference arithmetic unit 72 comprises a multi-level to multi-level conversion section 721 and a difference arithmetic unit 722.

The image conversion apparatus 70 carries out the first embodiment of an image conversion apparatus of the present invention in the manner as will be described hereinafter.

Figure 5:
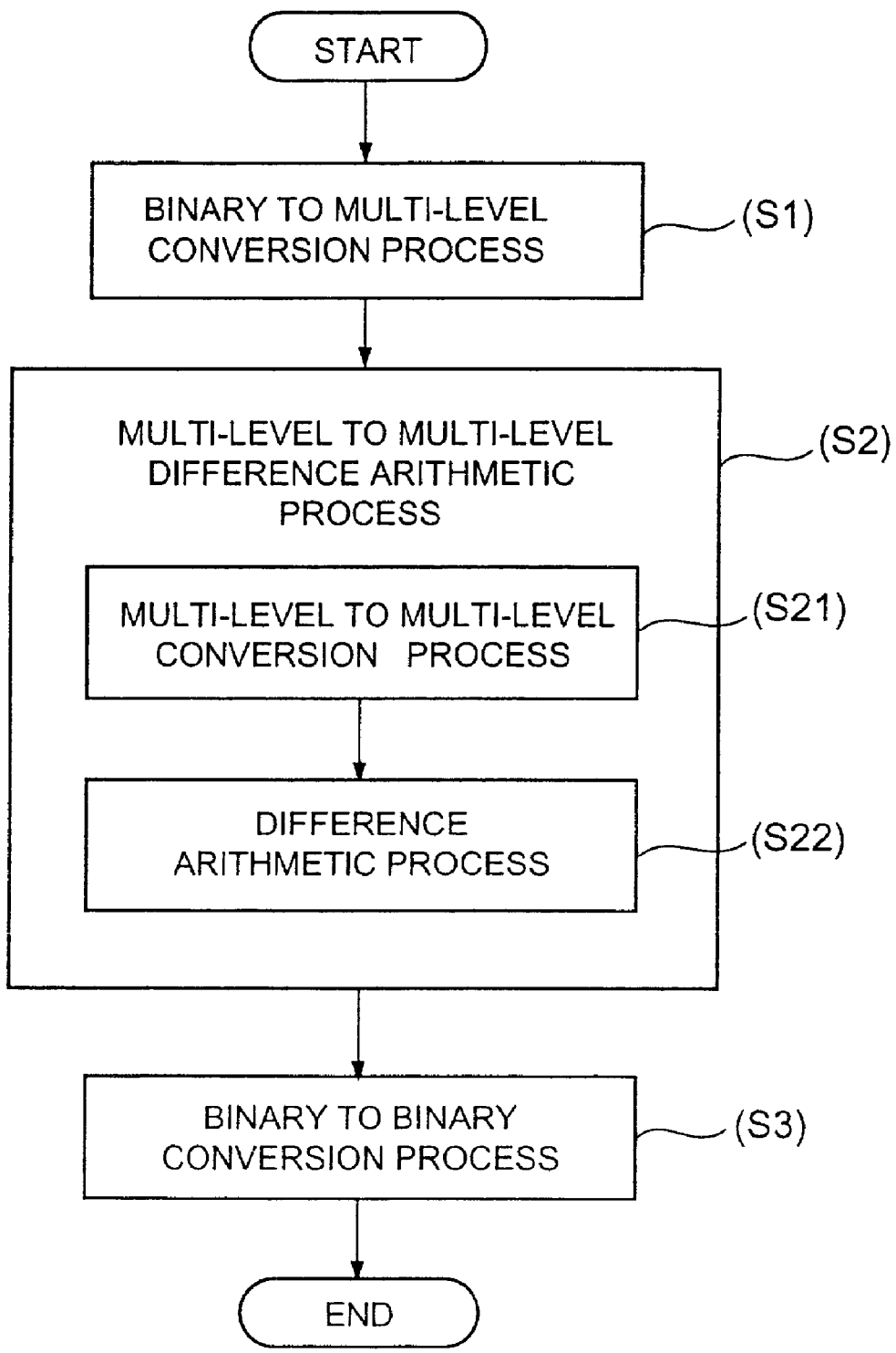
FIG. 5 is a flowchart useful for understanding a first embodiment of an image conversion method of the present invention.

FIG. 5 is a flowchart useful for understanding a first embodiment of an image conversion method of the present invention. Hereinafter, there will be explained the flowchart of FIG. 5 referring to FIG. 4.

First, the binary to multi-level conversion section 71 receives a first binary area tonal image created on the workstation 20 (cf. FIG. 1). In the binary to multi-level conversion section 71, according to a binary to multi-level conversion process (a step S1 in FIG. 5), the first binary area tonal image is converted into a first multi-level image consisting of an assembly of pixels each having a pixel value according to an areal ratio of the associated divided area of a plurality of divided areas.

Next, the first multi-level image is fed to the multi-level to multi-level difference arithmetic unit 72. Then, in the multi-level to multi-level conversion section 721 constituting the multi-level to multi-level difference arithmetic unit 72, pixel values of pixels of the first multi-level image are converted in accordance with a multi-level to multi-level conversion process (a step S21) constituting a multi-level to multi-level difference arithmetic process (a step S2 in FIG. 5), so that a second multi-level image, which consists of an assembly of pixels having pixel values after the first multi-level image is converted, is created.

Further, both the first multi-level image and the second multi-level image are fed to the difference arithmetic unit 722 constituting the multi-level to multi-level difference arithmetic unit 72. In the difference arithmetic unit 722, a value representative of a difference between the associated pixels of the first multi-level image and the second multi-level image, that is, a difference value between the associated pixels in the present embodiment, is determined in accordance with a difference arithmetic process (a step S22) constituting the multi-level to multi-level difference arithmetic process (the step S2 in FIG. 5).

Incidentally, it is acceptable to provide such an arrangement that the multi-level to multi-level conversion and the difference arithmetic are made up into a conversion so that the difference value is obtained directly from the first multi-level image, without creating the second multi-level image.

Both the difference value and the first binary area tonal image are fed to the binary to binary conversion section 73. In the binary to binary conversion section 73, an areal ratio of the respective area associated with each of pixels of the second multi-level image, of the first binary area tonal image is increased or decreased in accordance with the difference value associated with the pixels, in accordance with a binary to binary conversion process (a step S3 in FIG. 5), so that the first binary area tonal image is converted into the second binary area tonal image in which the areal ratio of the respective area associated with each of pixels of the second multi-level image, of the first binary area tonal image is increased or decreased.

The binary to binary conversion process (a step S3 in FIG. 5) in the binary to binary conversion section 73 increases or decreases the areal ratio by inverting the boundary portion of binary of the first binary area tonal image.

Figure 6:
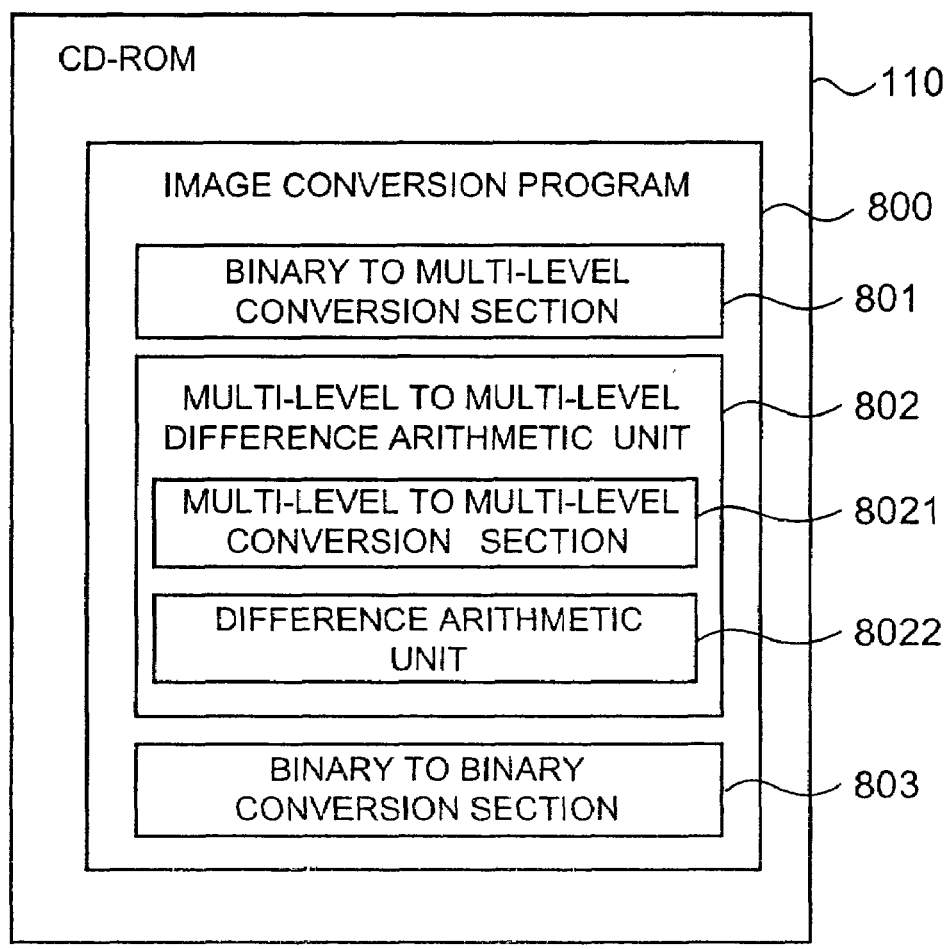
FIG. 6 is a view of a first embodiment of an image conversion program of the present invention.

FIG. 6 is a view of a first embodiment of an image conversion program of the present invention.

Here, the image conversion program is stored in the CD-ROM 110 shown in FIG. 3.

The image conversion program 800 has a binary to multi-level conversion section 801, a multi-level to multi-level difference arithmetic unit 802 and a binary to binary conversion section 803. The multi-level to multi-level difference arithmetic unit 802 comprises a multi-level to multi-level conversion section 8021 and a difference arithmetic unit 8022. The operation of those sections and units is the same as the operation of the same sections and units of the image conversion apparatus 70.

FIG. 7 to FIG. 9 are explanatory views each exemplarily showing the first embodiment of an image conversion method of the present invention.

A part (A) of FIG. 7 shows halftone dot data representative of a binary area tonal image expressed by a binary of 0 and 1, wherein a portion of 1 (a hatched portion) denotes a portion corresponding to areas to which ink is applied at the time of printing. This binary area tonal image (the part (A) of FIG. 7) exemplarily shows a binary area tonal image representative of monochromatic image, according to the present embodiment, and is a part of the first binary area tonal image shown in FIG. 4. A domain of 0 or 1 is referred to as a dot.

A part (B) of FIG. 7 is representative of a part of the first multi-level image. An image conversion from the binary area tonal image (the part (A) of FIG. 7) to the first multi-level image (the part (B) of FIG. 7) is performed in accordance with a processing corresponding to the binary to multi-level conversion process (the step S1 in FIG. 5), in the binary to multi-level conversion section 71 shown in FIG. 4. Here, the first binary area tonal image (the part (A) of FIG. 7) of 2400 dpi is divided into 4 dots×4 dots areas, and is converted into the first multi-level image (the part (B) of FIG. 7) consisting of pixels having 17 gradations of 0 to 16 where the number of dots of 1 within the divided areas is expressed in form of the pixel value.

A part (C) of FIG. 7 is representative of a part of the second multi-level image that is obtained through the conversion of the pixel values of the pixels of the first multi-level image. An image conversion from the first multi-level image (the part (B) of FIG. 7) to the second multi-level image (the part (C) of FIG. 7) is performed in accordance with a processing corresponding to the multi-level to multi-level conversion process (the step S21 in FIG. 5) constituting the multi-level to multi-level difference arithmetic process (the step S2 in FIG. 5), in the multi-level to multi-level conversion section 721 constituting the multi-level to multi-level difference arithmetic unit 72 shown in FIG. 4. Here, a color matching processing based on a one-dimensional LUT is applied to the first multi-level image (the part (B) of FIG. 7), and the first multi-level image (the part (B) of FIG. 7) is converted into the second multi-level image (the part (C) of FIG. 7).

FIG. 8 is representative of a difference image in which a difference value between the pixel values of the associated pixels between the first multi-level image (the part (B) of FIG. 7) and the second multi-level image (the part (C) of FIG. 7) is expressed in form of a pixel value. When the second multi-level image is determined in the manner as mentioned above, a processing corresponding to the difference arithmetic process (the step S22) constituting the multi-level to multi-level difference arithmetic process (the step S2 in FIG. 5), in the difference arithmetic unit 722 constituting the multi-level to multi-level difference arithmetic unit 72 shown in FIG. 4, is carried out between the associated pixels between the first multi-level image (the part (B) of FIG. 7) and the second multi-level image (the part (C) of FIG. 7), so that the difference values shown in FIG. 8 are determined on each pixel position.

FIG. 9 is a view exemplarily showing a part of the second binary area tonal image that is obtained through the processing corresponding to the binary to binary conversion process (the step S3 in FIG. 5), in the binary to binary conversion section 73 shown in FIG. 4. Here, the number of dots of 1 within each of the divided areas, where each of the pixels of second multi-level image (the part (C) of FIG. 7) is associated with each area of 4 dots×4 dots of the first binary area tonal image (the part (A) of FIG. 7), is increased or decreased in accordance with the difference value shown in FIG. 8, so that the first binary area tonal image shown in the part (A) of FIG. 7 is converted into the second binary area tonal image shown in FIG. 9.

Specifically, regarding the difference image shown in FIG. 8, only the pixel appearing upper left offers 1 and the remaining pixels offer 0. Accordingly, only the divided area appearing upper left of the first binary area tonal image shown in the part (A) of FIG. 7 is subjected to such processing that the dot of 0, which is adjacent to the portion to which dots of 1 gathered, is converted into 1 by one dot, so that the second binary area tonal image shown in FIG. 9 is determined.

In this manner, according to the present embodiment, a binary area tonal image is once converted into a multi-level image, and then a pixel value of the multi-level image is converted, and thus at this stage an operation for a color matching is performed. Further, according to the present embodiment, an areal ration of each divided area corresponding to the associated pixel of the multi-value image, of the original binary area tonal image is increased or decreased in accordance with the difference value between the pixel values of the associated pixels between the multi-value image after conversion of the pixel value and the multi-value image before conversion of the pixel value. Thus, according to the present embodiment, as compared with the original binary area tonal image, the halftone dot structure is changed by the corresponding fluctuation in the areal ratio according to the difference value. However, as compared with one in which halftone dot data is generated in accordance with the quite different halftone dot structure, according to the present embodiment, it is possible to obtain a new binary area tonal image having the halftone dot structure very close to that of the original binary area tonal image.

Next, there will be described a second embodiment of the present invention. According to the above-mentioned first embodiment, the embodiment has been explained taking into consideration the monochromatic image. On the other hand, according to the second embodiment, the embodiment will be explained taking into consideration a color image consisting of monochromatic images of four colors of C, M, Y and K.

Figure 10:
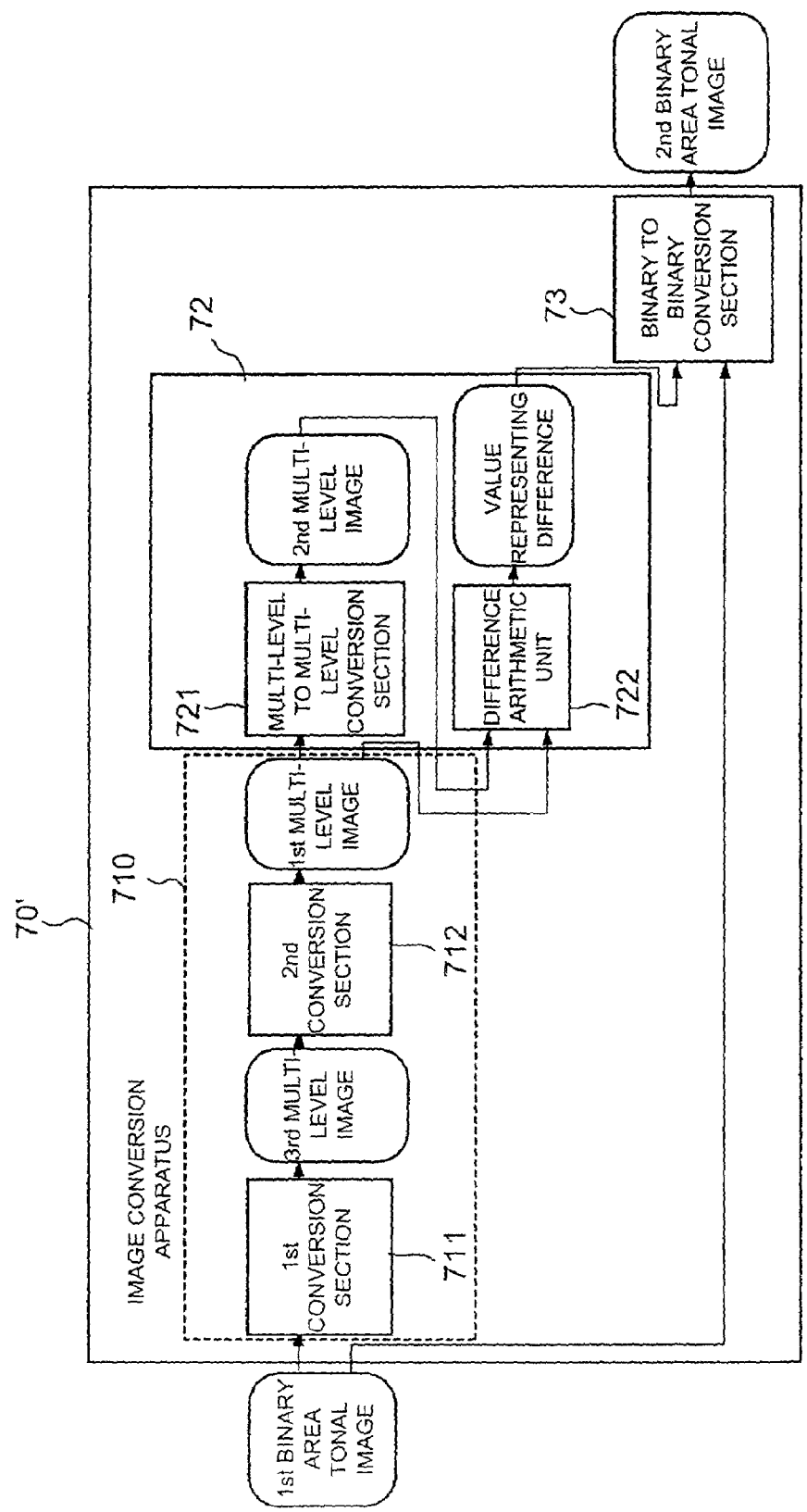
FIG. 10 is a functional block diagram of a second embodiment of an image conversion apparatus of the present invention.

FIG. 10 is a functional block diagram of a second embodiment of an image conversion apparatus of the present invention.

An image conversion apparatus 70' is constituted of the personal computer 50 shown in FIG. 1 to FIG. 3 and an image conversion program to be executed by the personal computer 50. The image conversion apparatus 70' has a binary to multi-level conversion section 710 comprising a first conversion section 711 and a second conversion section 712, instead of the binary to multi-level conversion section 71 of the image conversion apparatus 70 shown in FIG. 4. With respect to the multi-level to multi-level difference arithmetic unit 72 and the binary to binary conversion section 73, they are the same as the image conversion apparatus 70 shown in FIG. 4. Of those elements, a multi-level to multi-level conversion section 721 and a difference arithmetic unit 722, which constitute the multi-level to multi-level difference arithmetic unit 72, are also the same as the image conversion apparatus 70 shown in FIG. 4.

The image conversion apparatus 70' performs the second embodiment of the image conversion method of the present invention, as will be described hereinafter.

Figure 11:
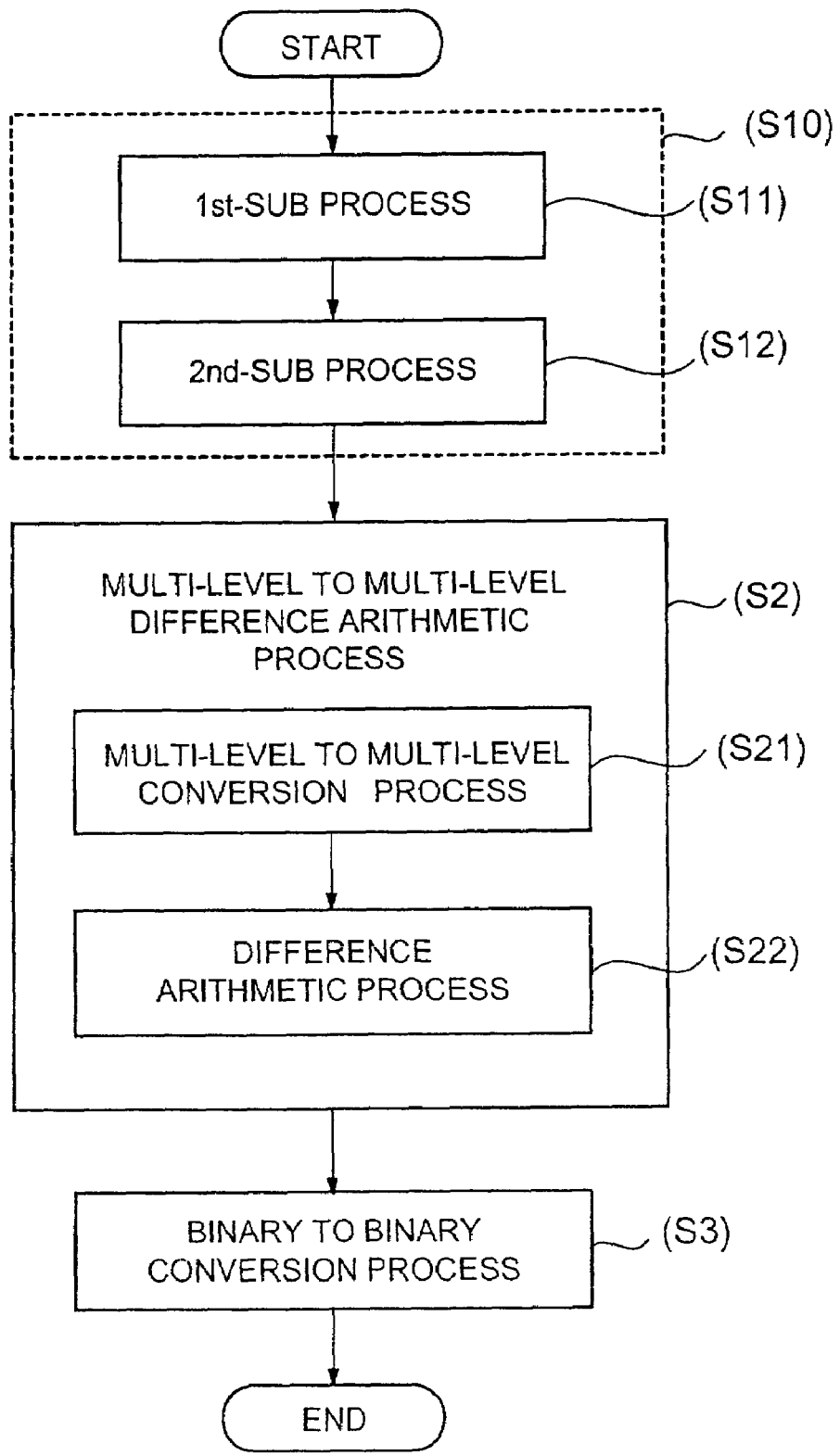
FIG. 11 is a flowchart useful for understanding a second embodiment of an image conversion method of the present invention.

FIG. 11 is a flowchart useful for understanding a second embodiment of an image conversion method of the present invention. Hereinafter, there will be explained the flowchart of FIG. 11 referring to FIG. 10.

Here, instead of the binary to multi-level conversion process (the step S1 in FIG. 5) there is provided a binary to multi-level conversion process (a step S10 in FIG. 11) consisting of a first sub-process (a step S11 in FIG. 11) and a second sub-process (a step S12 in FIG. 11).

First, the first conversion section 711 receives first binary area tonal images of four colors corresponding to C, M, Y and K constituting a color image created on the workstation 20 (cf. FIG. 1). The first conversion section 711 converts the first binary area tonal images of four colors into the third multi-level images of four colors, each consisting of an assembly of pixels each having a pixel value according to the areal ration of the associated divided area in which the associated first binary area tonal image is divided into a plurality of areas, in accordance with the first sub-process (the step S11 in FIG. 11).

Four colors of the third multi-level images thus obtained are fed to the second conversion section 712. The second conversion section 712 applies an image processing to four colors of the third multi-level images in accordance with the second sub-process (the step S12 in FIG. 11) so that four colors of the first multi-level images are created. Here, in the image processing of the second sub-process, in order to reduce moiré which will be caused by interference between a period of division intervals wherein the first binary area tonal image is divided at even intervals in the first sub-process (the step S11 in FIG. 11) and a period of halftone dots of the first binary area tonal image, a low spatial frequency filtering processing is applied.

Next, the multi-level to multi-level difference arithmetic unit 72 receives the four colors of the first multi-level images. Then, in the multi-level to multi-level conversion section 721 constituting the multi-level to multi-level difference arithmetic unit 72, the pixel values of the pixels of the first multi-level image of each of C, M, Y and K are converted in accordance with the multi-level to multi-level conversion process (the step S21) constituting the multi-level to multi-level difference arithmetic process (the step S2 in FIG. 11), so that a second multi-level image of each of C, M, Y and K, which consists of an assembly of pixels having pixel values after the first multi-level image of each of C, M, Y and K is converted, is created.

Here, in the multi-level to multi-level conversion process (the step S21 in FIG. 11) in the multi-level to multi-level conversion section 721, the first multi-level image of each of C, M, Y and K is converted into the second multi-level image of each of C, M, Y and K through a multi-dimensional conversion (here four-dimensional conversion for C, M, Y and K). There will be described the multi-dimensional conversion (four-dimensional conversion).

The difference arithmetic unit 722 constituting the multi-level to multi-level difference arithmetic unit 72 receives both the first multi-level images for four colors of C, M, Y and K before such a multi-dimensional conversion being carried out and the second multi-level images for four colors of C, M, Y and K after such a multi-dimensional conversion being carried out. The difference arithmetic unit 722 determines a value representative of a difference between the associated pixels of the first multi-level image and the second multi-level image independently on each of colors of C, M, Y and K, that is, a difference value of the pixel values between the associated pixels, in the present embodiment, in accordance with the difference arithmetic process (the step S22) constituting the multi-level to multi-level difference arithmetic process (the step S2 in FIG. 11).

Incidentally, it is acceptable to provide such an arrangement that the multi-level to multi-level conversion and the difference arithmetic are made up into a conversion so that the difference value is obtained directly from the first multi-level image, without creating the second multi-level image.

Both the difference image for each of colors of C, M, Y and K, consisting of the difference value, and the first binary area tonal image for each of colors of C, M, Y and K are fed to the binary to binary conversion section 73. In the binary to binary conversion section 73, an areal ratio of the respective area associated with each of pixels of the second multi-level image, of the first binary area tonal image is increased or decreased in accordance with the difference value associated with the pixels, in accordance with a binary to binary conversion process (a step S3 in FIG. 11), so that the first binary area tonal image for each color is converted into the second binary area tonal image for each color in which the areal ratio of the respective area associated with each of pixels of the second multi-level image, of the first binary area tonal image is increased or decreased.

The binary to binary conversion process (a step S3 in FIG. 11) in the binary to binary conversion section 73 increases or decreases the areal ration by inverting the boundary portion of binary of the first binary area tonal image, in a similar fashion to that of the above-mentioned first embodiment.

Figure 12:
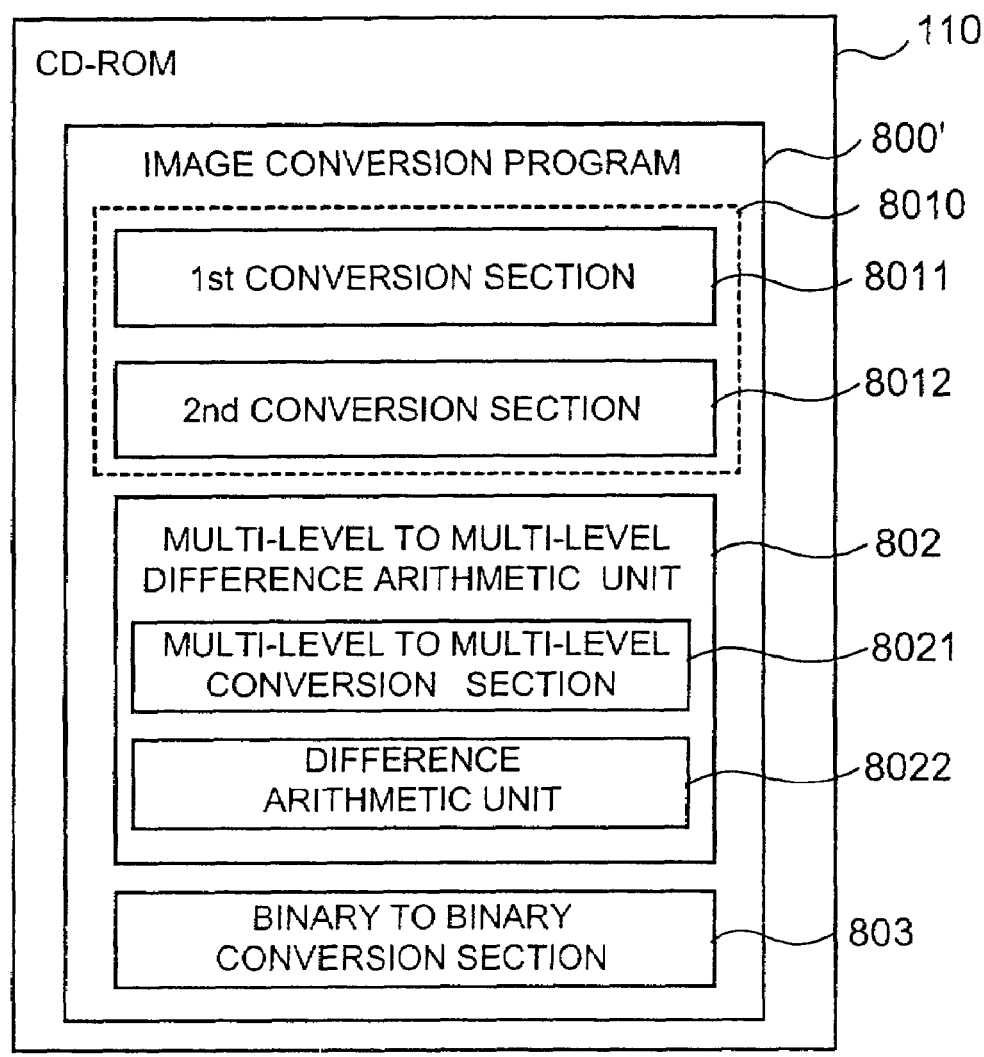
FIG. 12 is a view of a second embodiment of an image conversion program of the present invention.

FIG. 12 is a view of a second embodiment of an image conversion program of the present invention.

Here, the image conversion program is stored in the CD-ROM 110 shown in FIG. 3.

An image conversion program 800' has, instead of the binary to multi-level conversion section 801 of the image conversion program 800 shown in FIG. 6, a binary to multi-level conversion section 8010 comprising a first conversion section 8011 and a second conversion section 8012. Further, the image conversion program 800' has, similar to the image conversion program 800 shown in FIG. 6, a multi-level to multi-level difference arithmetic unit 802 and a binary to binary conversion section 803. The operation of those sections and units is the same as the operation of the same sections and units of the above-mentioned image conversion apparatus 70'. The operation of the multi-level to multi-level conversion section 8021 and the difference arithmetic unit 8022 constituting the multi-level to multi-level difference arithmetic unit 802 is also the same as the operation of the same sections and units of the above-mentioned image conversion apparatus 70'.

FIG. 13 to FIG. 16 are explanatory views each exemplarily showing the second embodiment of an image conversion method of the present invention.

A part (A) of FIG. 13 shows halftone dot data representative of a binary area tonal image expressed by a binary of 0 and 1, wherein a portion of 1 (a hatched portion) denotes a portion corresponding to areas to which ink is applied at the time of printing. This binary area tonal image (the part (A) of FIG. 13) exemplarily shows a binary area tonal image representative of a monochromatic image C, which is one of the binary area tonal images for four colors of C, M, Y and K representative of monochromatic images wherein a color image is color-separated, according to the present embodiment, and is a part of the first binary area tonal image shown in FIG. 10. A domain of 0 or 1 is referred to as a dot.

A part (B) of FIG. 13 is representative of a part of the first multi-level image. An image conversion from the binary area tonal image (the part (A) of FIG. 13) to the first multi-level image (the part (B) of FIG. 13) is performed in accordance with a processing corresponding to the binary to multi-level conversion process (the step S11 in FIG. 11), in the binary to multi-level conversion section 711 shown in FIG. 10. Here, the first binary area tonal image (the part (A) of FIG. 13) of 2400 dpi is divided into 4 dots×4 dots areas, and is converted into the first multi-level image (the part (B) of FIG. 13) consisting of pixels having 17 gradations of 0 to 16 where the number of dots of 1 within the divided areas is expressed in form of the pixel value.

A part (C) of FIG. 13 is representative of a part of the multi-level image that is obtained through the conversion of the pixel values of the pixels of the third multi-level image. An image conversion from the third multi-level image (the part (B) of FIG. 13) to the multi-level image (the part (C) of FIG. 13) is performed in accordance with a low spatial frequency filtering processing corresponding to the first sub-process (the step S12 in FIG. 11), in the second conversion section 712 shown in FIG. 10. According to the low spatial frequency filtering processing to be applied here, for example, a pixel value of a pixel of coordinates (X, Y) is expressed by R (X, Y), and the pixel value R (X, Y) of the pixel of coordinates (X, Y) is converted into a pixel value R' (X, Y) wherein a sum of pixel values of the peripheral 8 pixels of the pixels of the coordinates (X, Y) is expressed by a new pixel value of the pixel, where $$R'(X,Y)=R(X-1,Y-1)+R(X,Y-1)+R(X+1,Y-1)+R(X-1,Y)+R(X+1,Y)+R(X-1,Y+1)+R(X,Y+1)+R(X+1,Y+1)$$

When this processing is performed on all the pixels, the third multi-level image (the part (B) of FIG. 13) consisting of pixels having 17 gradations of 0 to 16 is converted into the multi-level image (the part (C) of FIG. 13) consisting of pixels having 129 gradations of 0 to 128.

A part (D) of FIG. 13 is representative of a part of the multi-level image that is obtained through the further conversion of the pixel values of the pixels of the multi-level image (the part (C) of FIG. 13). The image conversion from the multi-level image (the part (C) of FIG. 13) to the multi-level image (the part (D) of FIG. 13) is performed by the low spatial frequency filtering processing as mentioned above. This is implemented in such a manner that when the similar operation to that of the image conversion from the third multi-level image (the part (B) of FIG. 13) to the multi-level image (the part (C) of FIG. 13) is performed again, the multi-level image (the part (C) of FIG. 13) consisting of pixels having 129 gradations of 0 to 128 is converted into the multi-level image (the part (D) of FIG. 13) consisting of pixels having 1025 gradations of 0 to 1024.

A part (E) of FIG. 13 is representative of a part of the multi-level image that is obtained through the conversion of a resolution of the multi-level image (the part (D) of FIG. 13). According to the image conversion from the multi-level image (the part (D) of FIG. 13) to the multi-level image (the part (E) of FIG. 13), the resolution is converted into ¼. That is, here, the multi-level image (the part (D) of FIG. 13) of 600 dpi consisting of the pixels having 1025 gradations of 0 to 1024 is converted into the multi-level image (the part (E) of FIG. 13) of 150 dpi consisting of the pixels having 16385 gradations of 0 to 1684 wherein a sum of pixel values within the area of 4 pixels×4 pixels of the multi-level image (the part (D) of FIG. 13) is expressed by a new pixel value.

A part (F) of FIG. 13 is representative of a part of the multi-level image that is obtained through the conversion of a gradation of the multi-level image (the part (E) of FIG. 13). According to the image conversion from the multi-level image (the part (E) of FIG. 13) to the multi-level image (the part (F) of FIG. 13), the multi-level image (the part (E) of FIG. 13) of 150 dpi consisting of the pixels having 16385 gradations of 0 to 1684 is converted into the first multi-level image (the part (F) of FIG. 13) of 150 dpi consisting of the pixels having 256 gradations of 0 to 255.

The operations of the part (A) of FIG. 13 to the part (F) of FIG. 13, as mentioned above, are performed on each of the first binary area tonal images for four colors of C, M, Y and K to obtain the first multi-level image of 150 dpi on each of four colors of C, M, Y and K.

Figure 14:
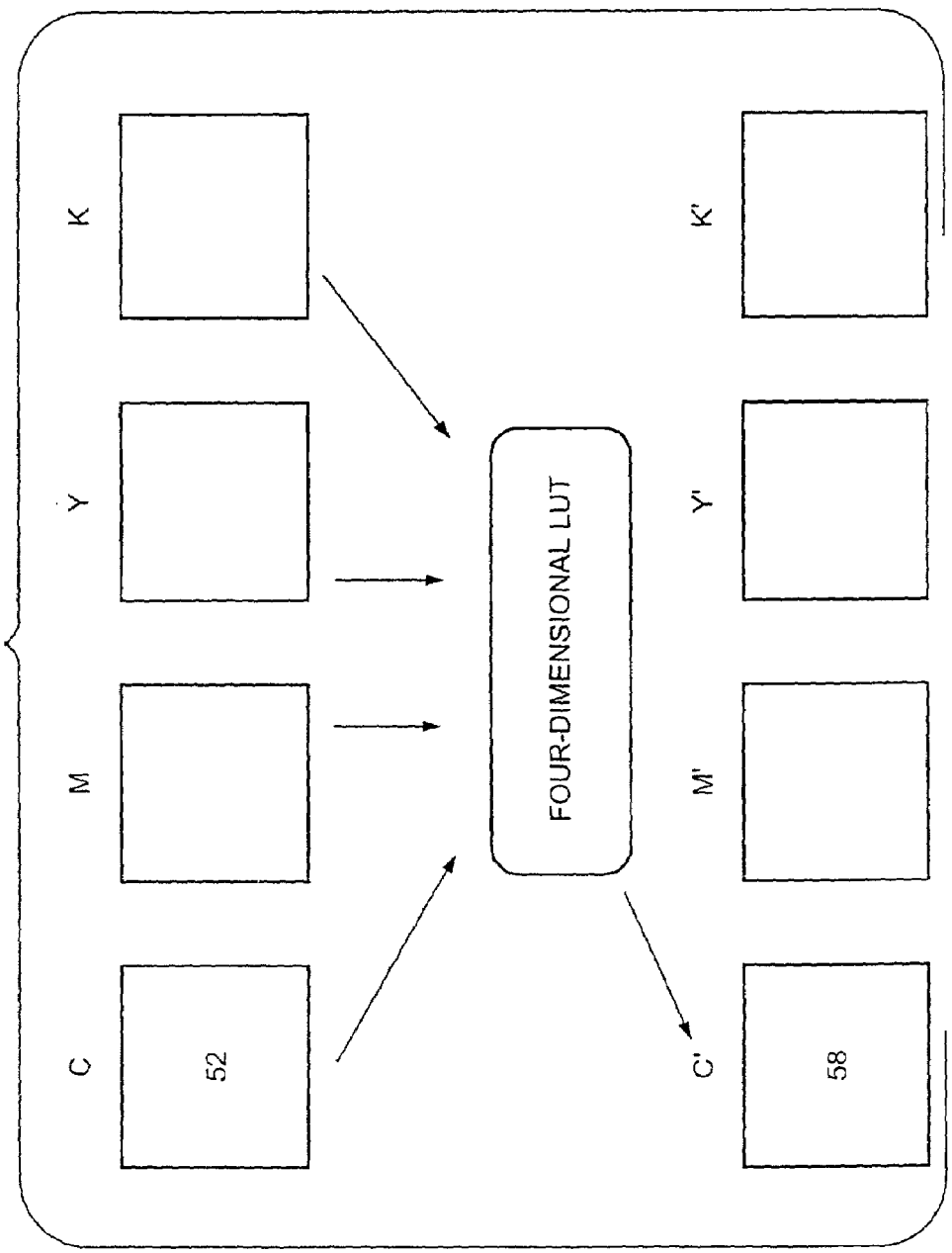
FIG. 14 is an explanatory view exemplarily showing the second embodiment of an image conversion method of the present invention.

FIG. 14 is representative of a part of the second multi-level image on each of C', M', Y' and K', which is obtained through the conversion of pixel values of pixels of the first multi-level image on each of C, M, Y and K. The image conversion from the first multi-level image on each of C, M, Y and K as shown in FIG. 14 to the second multi-level image on each of C', M', Y' and K' is performed in accordance with a processing corresponding to the multi-level to multi-level conversion process (the step S21 in FIG. 11) constituting the multi-level to multi-level difference arithmetic process (the step S2 in FIG. 11), in the multi-level to multi-level conversion section 721 constituting the multi-level to multi-level difference arithmetic unit 72 shown in FIG. 10. Here, a color matching processing based on a four-dimensional LUT is applied to the first multi-level image for four colors of C, M, Y and K, and the first multi-level image for four colors of C, M, Y and K is converted into the second multi-level image for four colors of C', M', Y' and K' through the multi-dimensional conversion (here four-dimensional conversion for C, M, Y and K).

Here, with respect to the multi-dimensional conversion, by way of example, four-dimensional conversion for C, M, Y and K will be explained. When pixel values of C, M, Y and K before conversion are denoted by $C_0$, $M_0$, $Y_0$ and $K_0$, and pixel values of C, M, Y and K after conversion are denoted by $C_1$, $M_1$, $Y_1$ and $K_1$, as set fourth below, $$C_1 = f_1(C_0, M_0, Y_0, K_0)$$

$$M_1 = f_2(C_0, M_0, Y_0, K_0)$$

$Y_1 = f_3(C_0, M_0, Y_0, K_0)$ $K_1 = f_4(C_0, M_0, Y_0, K_0)$ four dimensional conversion is performed where all the pixel values $C_0$, $M_0$, $Y_0$ and $K_0$ of C, M, Y and K before conversion are given as variables with respect to any one of the pixel values $C_1$, $M_1$, $Y_1$ and $K_1$ of C, M, Y and K after conversion.

Figure 15:
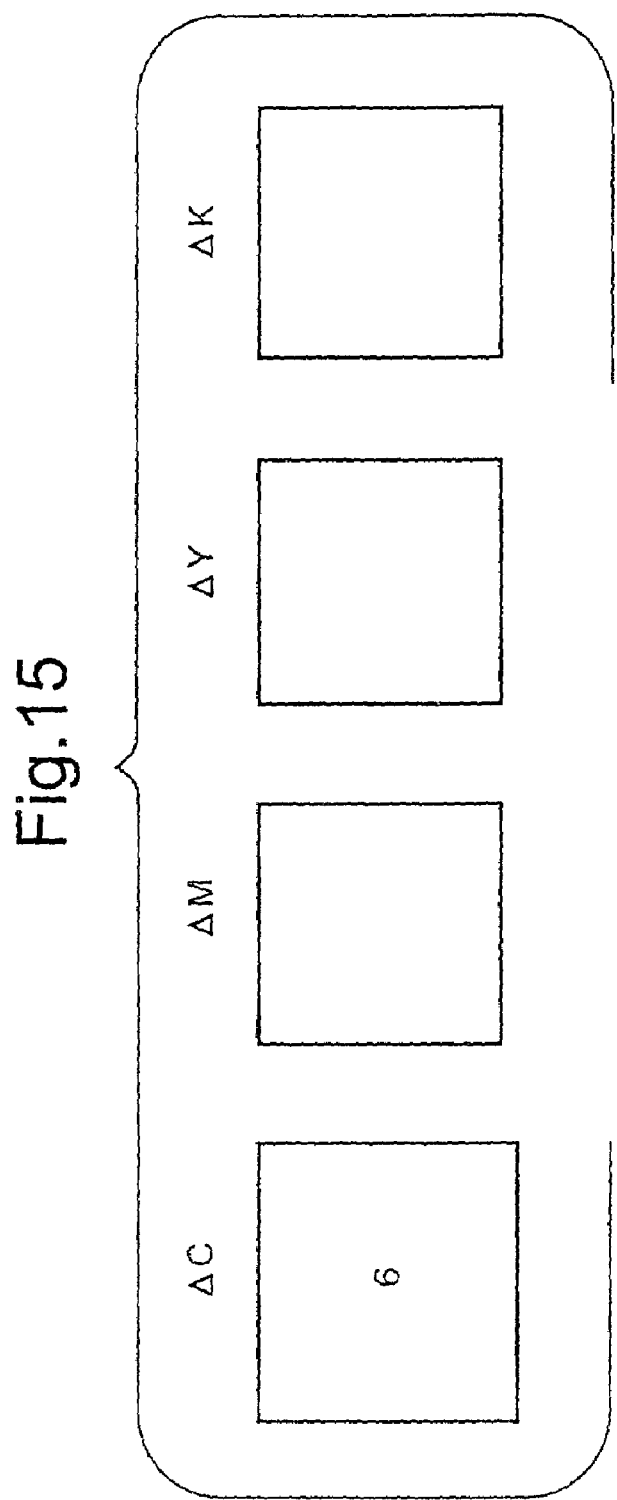
FIG. 15 is an explanatory view exemplarily showing the second embodiment of an image conversion method of the present invention.

FIG. 15 shows difference images for C, M, Y and K wherein a difference value between pixel values of the associated pixels between the first multi-level image on each of C, M, Y and K shown in FIG. 14 and the second multi-level image on each of C', M', Y' and K'. In the manner as mentioned above, when the second multi-level image on each of C', M', Y' and K' is determined, then the processing corresponding to the difference arithmetic process (the step S22 in FIG. 11) constituting the multi-level to multi-level difference arithmetic process (the step S2 in FIG. 11), in the difference arithmetic unit 722 constituting the multi-level to multi-level difference arithmetic unit 72 shown in FIG. 10 is performed in accordance with the first multi-level images for C, M, Y and K shown in FIG. 14 and the second multi-level images for C', M', Y' and K' to determine difference values ΔC, ΔM, ΔY and ΔK shown in FIG. 15 on the four colors.

Figure 16:
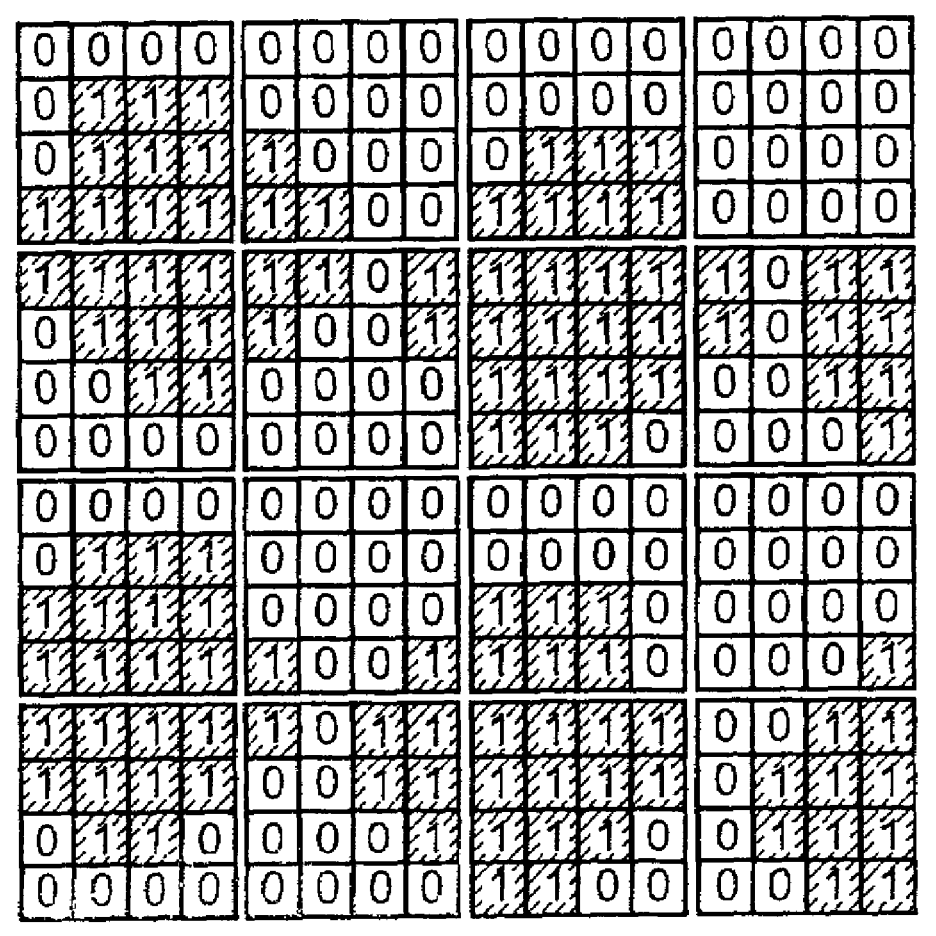

FIG. 16 exemplarily shows a part of the second binary area tonal image, which is obtained through the processing corresponding to the binary to binary conversion process (the step S3 in FIG. 11) in the binary to binary conversion section 73 shown in FIG. 10. Here, the respective "1" pixels of the second multi-level images for four colors of C', M', Y' and K' shown in FIG. 14 are associated with areas of 16 dots×16 dots of the first binary area tonal image shown in the part (A) of FIG. 13, and the number of dots of "1" within the associated area is increased or decreased in accordance with the difference values ΔC, ΔM, ΔY and ΔK shown in FIG. 15, so that the first binary area tonal image shown in the part (A) of FIG. 13 is converted into the second binary area tonal image shown in FIG. 16. FIG. 16 exemplarily shows a result according to the image conversion between the binary area tonal images representative of monochromatic images C.

Specifically, since the difference value ΔC of the monochromatic image C shown in FIG. 15 is 6, 6 dots of "0", which are adjacent to the portion to which dots of "1" of the area of 16 dots×16 dots of the first binary area tonal image shown in the part (A) of FIG. 13 are gathered, are converted into "1", so that the second binary area tonal image shown in FIG. 16 is determined.

Likely, the similar image conversion processing between the binary area tonal images is performed for each of monochromatic images for C, M, Y and K independently on each color of C, M, Y and K, so that the second binary area tonal images for C, M, Y and K are determined.

Incidentally, according to the embodiments as mentioned above, a conversion from the first multi-level image to the second multi-level image is performed, and then the difference value between the first multi-level image to the second multi-level image is determined. However, in any one of the embodiments, it is acceptable to provide such an arrangement that the conversion from the first multi-level image to the second multi-level image and arithmetic operation for determining the difference value are made up into a conversion so that the difference value is obtained directly from the first multi-level image, without creating the second multi-level image.

As mentioned above, according to the present invention, there are provided an image conversion method of converting binary area tonal image to binary area tonal image having the extremely same dot structure and being expressed by the extremely same color, an image conversion apparatus, and an image conversion program storage medium storing an image conversion program which causes a computer to operate as such an image conversion apparatus.

While the present invention has been described with reference to the particular illustrative embodiments, it is not to be restricted by those embodiments but only by the appended claims. It is to be appreciated that those skilled in the art can change or modify the embodiments without departing from the scope and sprit of the present invention.

What is claimed is:

1. An image conversion method comprising:
a binary to multi-level conversion step of converting a first binary area tonal image into a first multi-level image consisting of an assembly of pixels each having a pixel value according to an areal ratio of an associated divided area of a plurality of divided areas in said first binary area tonal image;
a multi-level to multi-level difference arithmetic step of determining a value representative of difference between associated pixels between the first multi-level image and a second multi-level image, which consists of an assembly of pixels having pixel values after the first multi-level image is converted in pixel values of pixels; and
a binary to binary conversion step of converting the first binary area tonal image into a second binary area tonal image in which the areal ratio of a respective area associated with each of pixels of the second multi-level image, of the first binary area tonal image is increased or decreased in accordance with the value representative of the difference between the associated pixels between the first multi-level image and the second multi-level image.

2. An image conversion method according to claim 1, wherein said multi-level to multi-level difference arithmetic step determines a value representative of difference between associated pixels between a plurality of first multi-level images in which a plurality of first binary area tonal images representative of a plurality of monochromatic images wherein a color image is color-separated are converted, and a plurality of second multi-level images, which are created by multi-dimensional conversion of the plurality of first multi-level images.

3. An image conversion method according to claim 1, wherein said binary to multi-level conversion step is replaced by a binary to multi-level conversion step comprising a first sub-step in which the first binary area tonal image is converted into a third multi-level image consisting of an assembly of pixels each having a pixel value according to an areal ratio of an associated divided area of a plurality of divided areas in said first binary area tonal image, and a second sub-step of applying an image processing to the third multi-level image obtained through the first sub-step to create the first multi-level image.

4. An image conversion method according to claim 3, wherein said second sub-step is a step of applying a low spatial frequency filtering processing to the third multi-level image.

5. An image conversion method according to claim 1, wherein said binary to binary conversion step inverts a boundary portion of the binary of said first binary area tonal image to increase or decrease the areal ratio.

6. An image conversion method according to claim 1, wherein said binary to binary conversion step comprises increasing or decreasing the areal ratio of respective areas of the first binary area tonal image associated with each of the pixels of the second multi-level image in accordance with a difference value associated with the pixels. section to create the first multi-level image.

7. An image conversion apparatus comprising:
a binary to multi-level conversion section for converting a first binary area tonal image into a first multi-level image consisting of an assembly of pixels each having a pixel value according to an areal ratio of an associated divided area of a plurality of divided areas in said first binary area tonal image;
a multi-level to multi-level difference arithmetic section for determining a value representative of difference between associated pixels between the first multi-level image and a second multi-level image, which consists of an assembly of pixels having pixel values after the first multi-level image is converted in pixel values of pixels; and
a binary to binary conversion section for converting the first binary area tonal image into a second binary area tonal image in which the areal ratio of a respective area associated with each of pixels of the second multi-level image, of the first binary area tonal image is increased or decreased in accordance with the value representative of the difference between the associated pixels between the first multi-level image and the second multi-level image.

8. An image conversion apparatus according to claim 6, wherein said binary to multi-level conversion section is replaced by a binary to multi-level conversion section comprising a first conversion section in which the first binary area tonal image is converted into a third multi-level image consisting of an assembly of pixels each having a pixel value according to an areal ratio of an associated divided area of a plurality of divided areas in said first binary area tonal image, and a second conversion section for applying an image processing to the third multi-level image obtained through the first conversion section to create the first multi-level image.

9. An image conversion program storage medium storing an image conversion program which causes a computer to operate as an image conversion apparatus for performing an image conversion between binary area tonal images, said image conversion program comprising:
a binary to multi-level conversion section for converting a first binary area tonal image into a first multi-level image consisting of an assembly of pixels each having a pixel value according to an areal ratio of an associated divided area of a plurality of divided areas in said first binary area tonal image;
a multi-level to multi-level difference arithmetic section for determining a value representative of difference between associated pixels between the first multi-level image and a second multi-level image, which consists of an assembly of pixels having pixel values after the first multi-level image is converted in pixel values of pixels; and
a binary to binary conversion section for converting the first binary area tonal image into a second binary area tonal image in which the areal ratio of a respective area associated with each of pixels of the second multi-level image, of the first binary area tonal image is increased or decreased in accordance with the value representative of the difference between the associated pixels between the first multi-level image and the second multi-level image.

10. An image conversion program storage medium according to claim 9, wherein said binary to multi-level conversion section is replaced by a binary to multi-level conversion section comprising a first conversion section in which the first binary area tonal image is converted into a third multi-level image consisting of an assembly of pixels each having a pixel value according to an areal ratio of an associated divided area of a plurality of divided areas in said first binary area tonal image, and a second conversion section for applying an image processing to the third multi-level image obtained through the first conversion section to create the first multi-level image.

* * * * *